Dec. 20, 1960

B. WOODWARD, JR., ET AL 2,965,028

FUZE FOR DEPTH CHARGE

Filed Dec. 5, 1952

INVENTORS
BERNARD WOODWARD JR
GRANT N. WILLIS
HERBERT SMALL
EARL A. SCHUCHARD

BY

ATTORNEYS

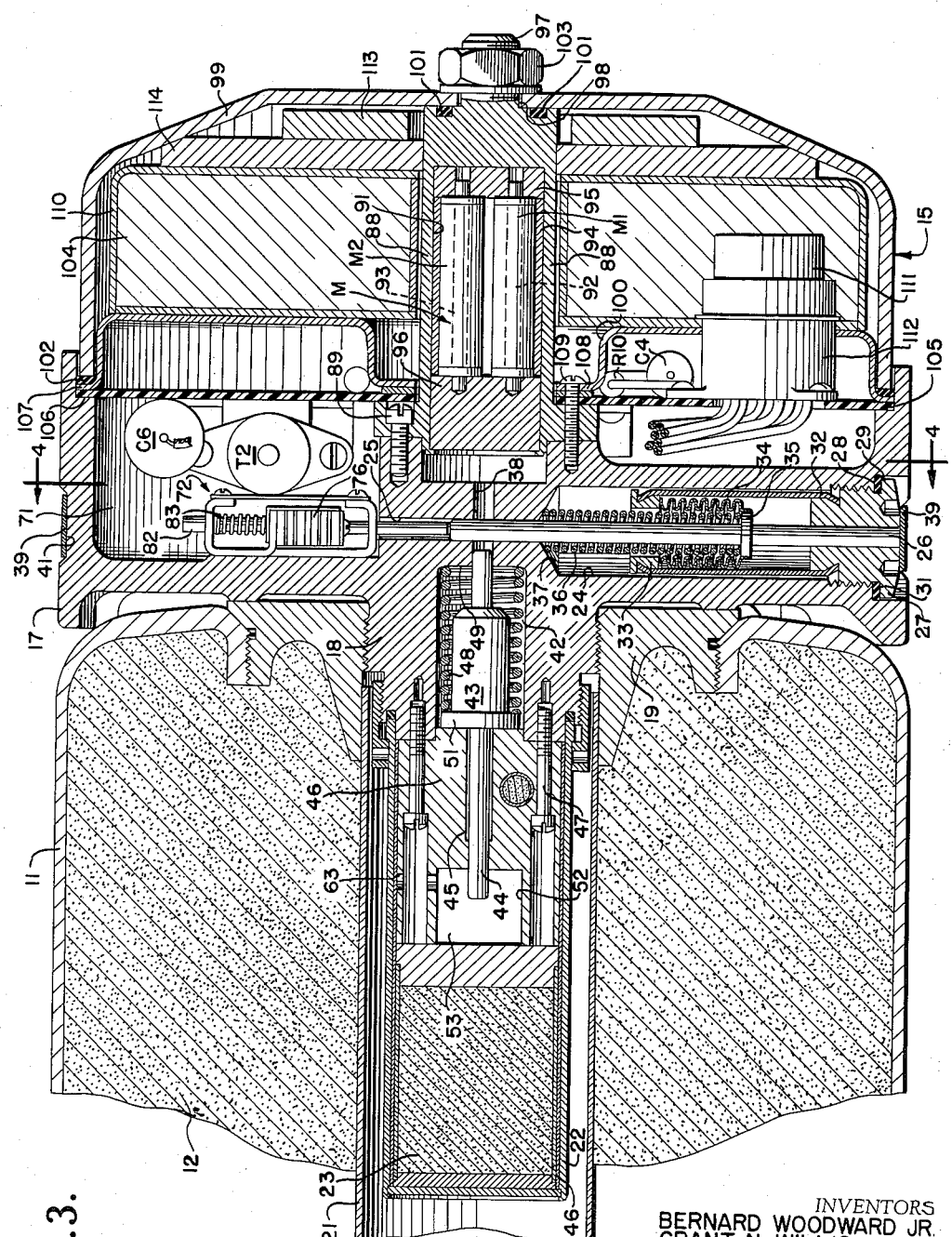

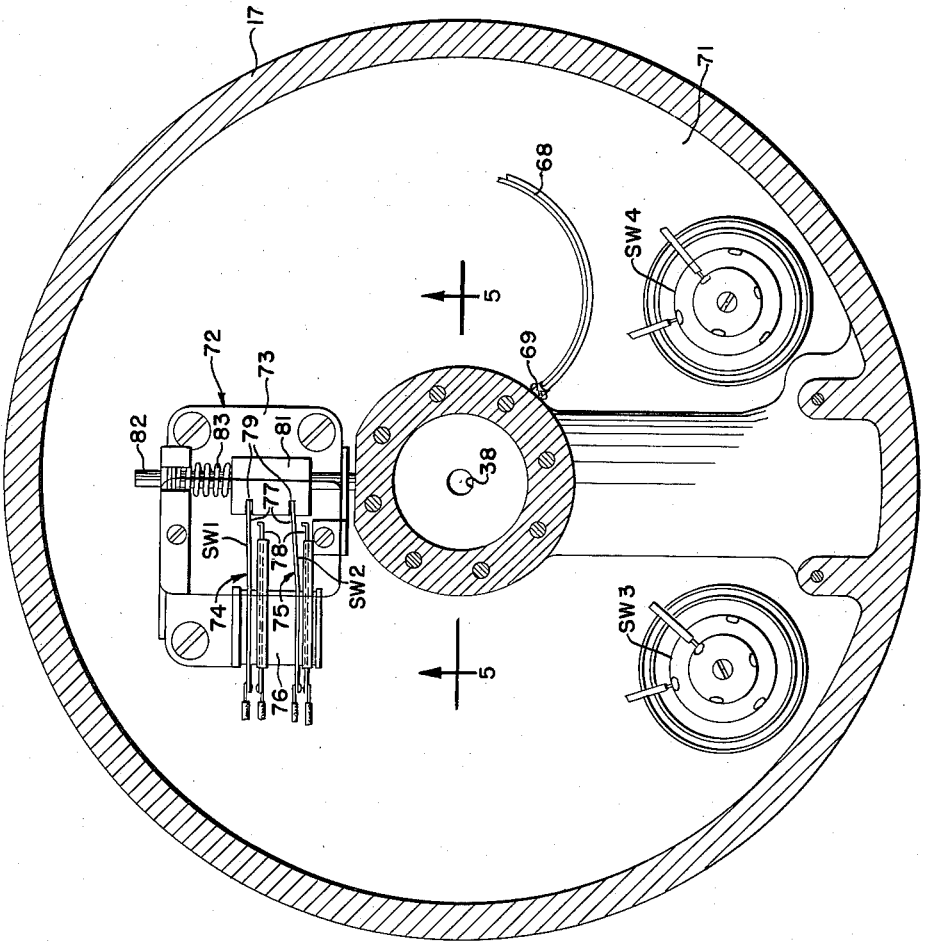
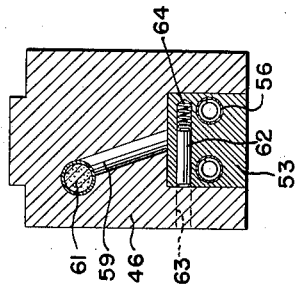
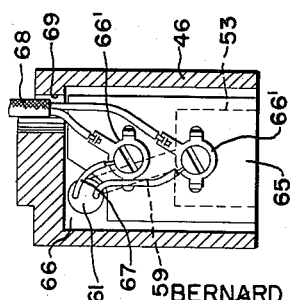

Dec. 20, 1960  B. WOODWARD, JR., ET AL  2,965,028
FUZE FOR DEPTH CHARGE
Filed Dec. 5, 1952  5 Sheets-Sheet 4

INVENTORS
BERNARD WOODWARD JR.
GRANT N. WILLIS
HERBERT SMALL
EARL A. SCHUCHARD

BY
R. M. Hicks
ATTORNEYS

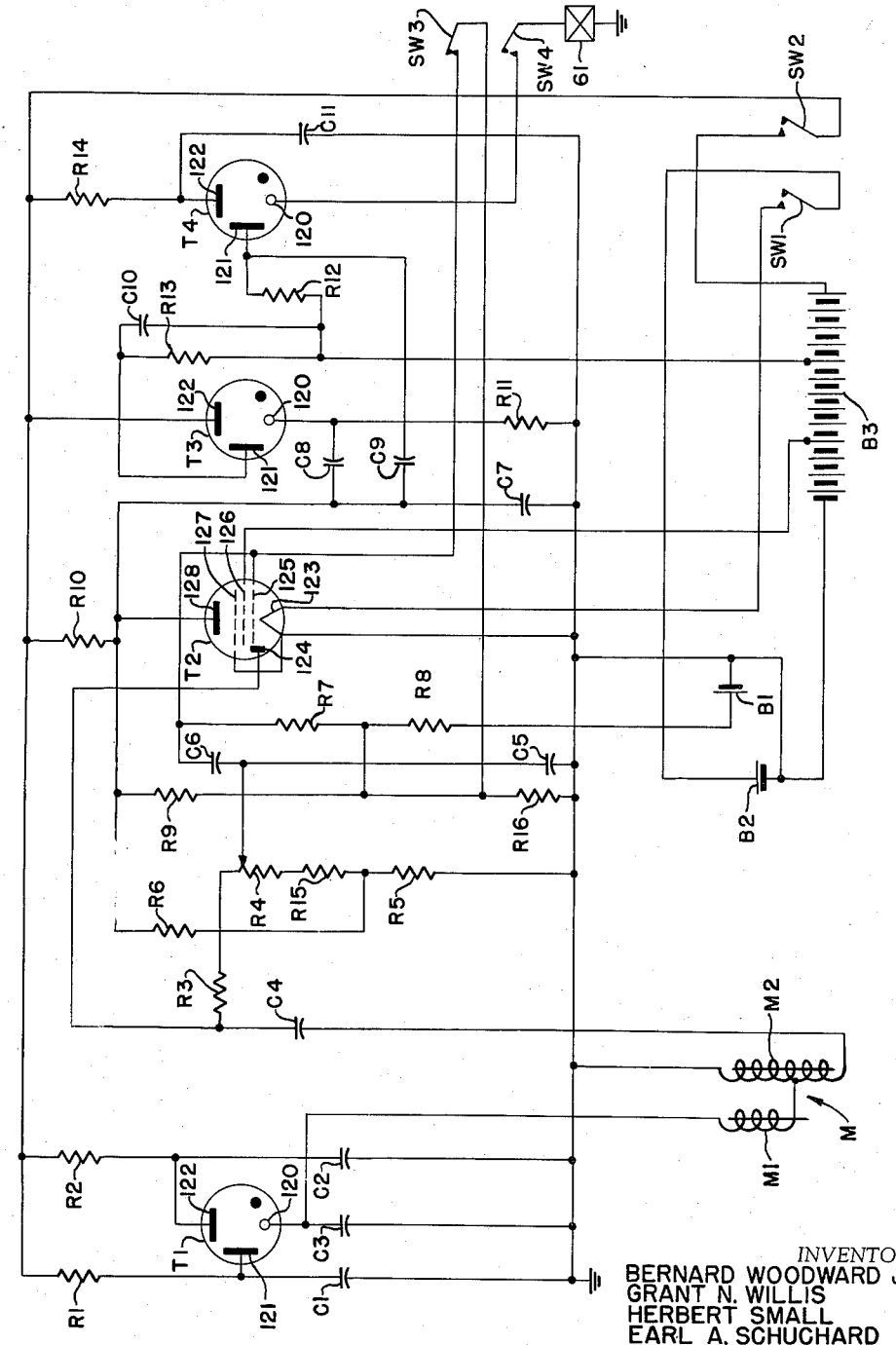

United States Patent Office 2,965,028
Patented Dec. 20, 1960

2,965,028
FUZE FOR DEPTH CHARGE

Bernard Woodward, Jr., 88 Castlebar Road, Rochester, N.Y.; Grant N. Willis, 141 Woodland St., Bristol, Conn.; Herbert Small, 8610 Garland Ave., Takoma Park, Md.; and Earl A. Schuchard, 8209 New Hampshire Ave., Hyattsville, Md.

Filed Dec. 5, 1952, Ser. No. 324,428

4 Claims. (Cl. 102—7)

(Granted under Title 35, U.S. Code (1952), sec. 266)

The invention described herein may be manufactured and used by or for the Government of the United States of America for governmental purposes without the payment of any royalties thereon or therefor.

The present invention relates to a magnetically influenced fuze for a depth charge. More particularly, the invention relates to a fuze mechanism having a magnetically influenced firing circuit for an ahead-thrown rocket propelled projectile containing a depth charge.

The depth charge device for which the mechanism and circuit of the present invention is employed is of the type launched from a vessel, is propelled during the forward travel thereof by a rocket motor and is armed by a plurality of devices which operate at appropriate times during the travel of the device, the warm-up of the electrical circuit being initiated as the device is launched, the detonator of the firing train of the fuze being mechanically alined with the primer and lead-in thereof as the device strikes the surface of a body of water, and the primer being connected to arm the firing circuit in time-delayed relation to entry of the device into a body of water when the device reaches a state of stable downward travel in the body of water. A magnetometer coil assembly is employed to detect changes in the earth's magnetic field as the device approaches a target formed of magnetic material such, for example, as a submarine which causes operation of the firing circuit to ignite the primer, thus firing the detonator, the lead-in, the booster charge and finally the main charge of the depth charge. The aforementioned delayed arming of the firing circuit is provided to prevent premature firing of the depth charge during the period of instability immediately following entry of the device into the body of water, such premature firing being caused by the angular variations of the magnetometer coils with respect to the earth's magnetic field, thus causing spurious signals to be picked up thereby sufficient to operate the firing circuit.

An object of the device of the present invention is to provide a new and improved magnetically influenced depth charge device having safety features which prevent firing thereof by spurious magnetic signals.

Another object is to provide a new and improved magnetically influenced depth charge device having a magnetometer detector which is highly efficient in detecting anomalies in the earth's magnetic field.

Still another object is to provide a new and improved detecting, amplifying, and firing circuit for a depth charge which is dependable, has low current consumption, and high efficiency in detecting anomalies of the earth's magnetic field.

A further object is to provide a fuze for a depth charge which combines novel mechanical and electrical elements to produce a depth charge device which meets service conditions with safety and efficient operation.

Other objects and many of the attendant advantages of this invention will be readily appreciated as the same becomes better understood by reference to the following detailed description when considered in connection with the accompanying drawings wherein:

Fig. 3 is a sectional view taken along the line 3—3 of Fig. 1;

Fig. 4 is a sectional view taken along the line 4—4 of Fig. 3;

Fig. 6 is a sectional view showing the locking detent for the detonator holder;

Fig. 7 is a sectional view showing the connector block for the primer leads;

Fig. 12 is a diagram of the pulse oscillating, detecting, amplifying, and firing circuits employed in the present invention.

Figure 1:
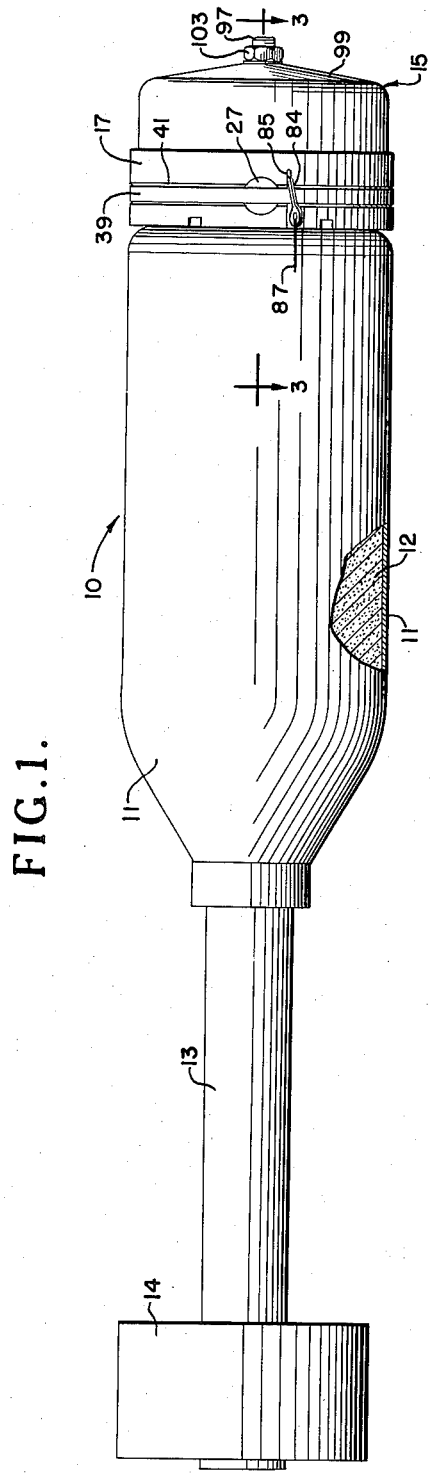
Fig. 1 is a side elevational view of the device of the present invention attached to the nose of a rocket-propelled depth charge device.
Figure 9:
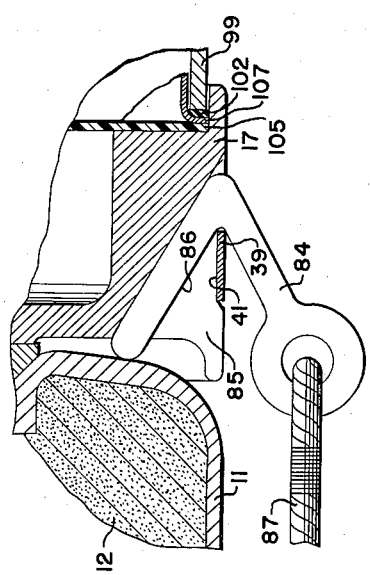
Fig. 9 is a detail sectional view of a portion of the mechanism casing and showing the cutting tool and lanyard therefor.
Figure 2:
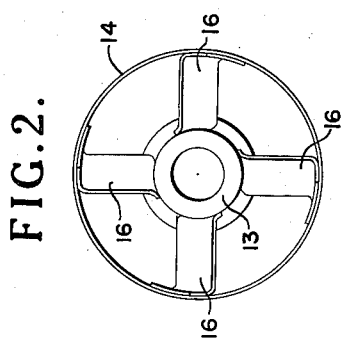
Fig. 2 is an end elevation of the fin portion of the depth charge device.

Referring more particularly to the Fig. 1 of the drawings a rocket-propelled depth charge is indicated generally at 10 and has a casing 11 containing a main explosive charge 12, a rocket motor 13 extending rearwardly therefrom, and a tail fin assembly 14 mounted adjacent the end of motor 13. Mounted on the nose of casing 11 is a magnetic influence firing mechanism indicated generally at 15.

The fins 16 of assembly 13 are mounted at an angle in order to impart a spinning motion to the depth charge 10.

Mechanism 15 is enclosed in a mechanism casing 17 having a threaded extension 18 which is threaded into adapter 19 of casing 11. Tubular casing 21 is fixed to adapter 19 and extends within the main charge 12. Mounted on extension 18 of member 17 is a booster charge housing 22 containing booster charge 23.

A transverse bore 24 having a reduced extension 25 is formed in casing 17 and receives pin 26. A plug 27 having an axial bore is screwed into the outer end of bore 24 and forms an outer support for pin 26. Bore 24 is enlarged to form shoulder 28 and plug 27 has a head forming a shoulder 29, gasket 31 being interposed between shoulder 28 and 29 to form a watertight joint at the periphery of plug 27. A tubular member 32 is mounted on the inner end of plug 27 and extends inwardly in bore 24. A ring 33 is mounted in the end of member 32 and has secured thereto and extending within member 32 a metallic bellows 34. Bellows 34, at the other end thereof is secured to a flange 35 of pin 26. Thus a positive watertight seal is formed between pin 26 and plug 27 which permits endwise movement of pin 26. An expansion spring 36 is mounted around pin 26 between flange 35 and a shoulder 37 defined by reduced extension 25 of bore 24 thus urging pin 26 outwardly of casing 17.

Casing 17 is provided with an axial bore 38 which intersects bore extension 25, pin 26 normally extending across and slightly beyond bore 38 thus closing off the bore. Pin 26 is retained in the aforementioned position by a metal strap 39 recessed in groove 41 around the periphery of casing 17. Axial bore 38 is enlarged to form a chamber 42 which accommodates an inertia weight 43 formed on shaft 44. Shaft 44, at one end thereof is mounted in axial bore 38 while the other end thereof is mounted in bore 45 of fuze casing 46. Fuze casing 46 is secured to the end of extension 18 by screws 47 and is enclosed by booster housing 22. A spring 48 is interposed between the wall 49 of chamber 42 and flange 51 of weight 43 to urge shaft 44 away from pin 26.

A transverse guideway 52 is formed in casing 46 adjacent booster charge 23 and has slidably mounted therein a detonator holder 53 containing detonator 54 in bore 55 and having a pair of springs 56 urging the holder 53 in a direction toward fixed pin 57. Shaft 44 normally extends out of bore 45 and into the path of holder 53 thus retaining detonator 54 in a safe position and out of alignment with lead-in 58 mounted in fuze casing 46 between guideway 52 and booster charge 23. Shaft 44 also retains detonator 54 out of alignment with bore 59 which leads to electrically fired primer 61. When holder 53 is released by shaft 44, in a manner to be hereinafter more fully described, springs 56 move holder 53 into contact with fixed pin 57 which aligns detonator 53 with lead-in 58 and bore 59 thus arming the detonator. In the armed position a detent 62 mounted in holder 53 is forced into bore 63 in casing 47 by spring 64 thus locking the detonator 54.

A connector block 65 of insulating material is mounted in recess 66 of fuze casing 46 and supports a pair of connectors 66′ thereon for leads 67 of electrical primer 61. Leads 68 connect to lead 67 at connectors 66′ and extend through bore 69 in extension 18 into mechanism chamber 71 in casing 17.

Mounted adjacent bore 25 is a switch assembly 72 which includes a frame member 73 on which is mounted a pair of switches 74 and 75 fixedly mounted at one end thereof and insulated from the frame 73 by insulator blocks 76. Each of the switches comprises a movable member 77 and a substantially fixed member 78.

The free ends of movable members 77 are set in notches 79 of insulator block 81. Insulator block 81 is fixed to and movable with shaft 82 which is slideably mounted in frame 73. Shaft 82 extends into bore 25 and is urged against the end of pin 26 by spring 83. As aforesaid pin 26 is held in the initial safe position by strap 39. In this position switches 74 and 75 are held in the open position. Switches 74 and 75 form a part of a circuit to be hereinafter more fully described.

A cutting tool 84 is mounted in slot 85 in casing 17 and has a cutting edge 86 which engages the strap 39. One end of a lanyard 87 is attached to one end of tool 84, the tool 84 severing the strap 39 as the depth charge is launched, the other end of the lanyard 87 being fixed to the vessel or launching device from which the depth charge is launched. When strap 39 is severed pin 26 moves outwardly of casing 17 under action of spring 36, releasing shaft 82 which is moved by spring 83 thus causing movable members 77 of switches 74 and 75 to contact members 75 thereof thus closing the switches. In the closed position shaft 82 is stopped short of the bore 38 while pin 26 moves beyond bore 38 thus leaving bore 38 clear and permitting shaft 44 and inertia weight 43 to move to the armed position thereof on impact of the depth charge with the surface of the water. The detonator is thus moved to the armed position as will be hereinafter more fully described.

An axially mounted cylinder 88 is bolted to member 17 at 89. Mounted within bore 91 of cylinder 88 is the magnetometer indicated generally at M. Magnetometer M comprises a pair of coils M1 and M2, provided with Permalloy cores 92 and 93 respectively. The magnetometer coils M1 and M2 are enclosed by a tubular nonmagnetic casing 94 having end plates 95 and 96 which support the coils M1 and M2 and the cores 92 and 93 therefor. Cylinder 88 is provided with a threaded extension 97 which extends through bore 98 of cup-shaped housing 99. Housing 99 is secured to cylinder 88 and drawn against sealing gasket 101 (adjacent bore 98) and gasket 102 (at the periphery of 99) by nut 103 which is threaded on extension 97. Housing 99 encloses battery assembly 104 and the components of the circuit mounted on plate 105. The components of the circuit mounted on one side of the plate 105 are additionally enclosed by a circular dished housing 100, the outer flange 107 thereof being gripped between gasket 102 and plate 105, while the inner flange 108 is secured to casing 17 by bolts 109. Plate 105 which is formed of a suitable insulating material is interposed between flange 107 and shoulder 106 of casing 17.

It is to be understood that casing 17, casing 94, housings 99 and 100 and as many as is practical of the elements, both mechanical and electrical, which make up the firing mechanism 15 are formed of non-magnetic materials suitable for the purpose such, for example, as aluminum, brass, bronze and plastic materials.

Battery assembly 104 is housed in casing 110 and comprises batteries B1, B2, and B3. Battery assembly 104 is provided with multiple connector plug 111 while a mating plug 112 is mounted on plate 105 for connection therewith, plugs 111 and 112 carrying leads from battery assembly 104 to the various circuit components mounted on plate 105.

If desired the leading face of housing 99 may be reinforced with filler discs 113, 114 against forces encountered when the surface of a body of water is struck thereby.

Figure 10:
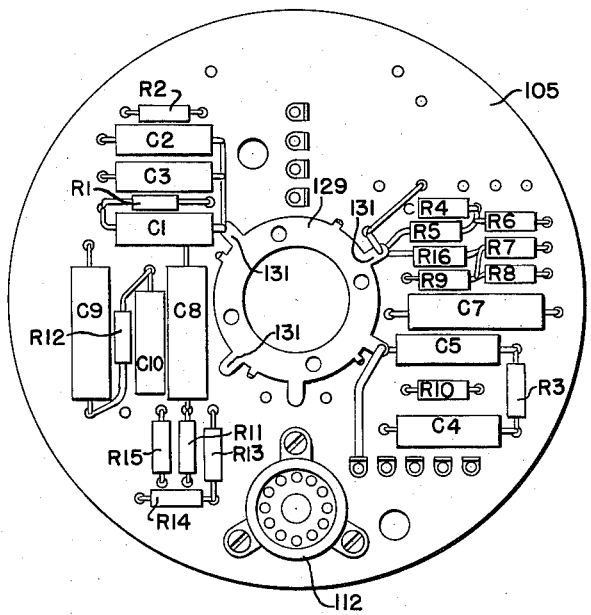
Fig. 10 is a detail elevation of the mounting plate with circuit components mounted thereon and showing one side thereof.
Figure 5:
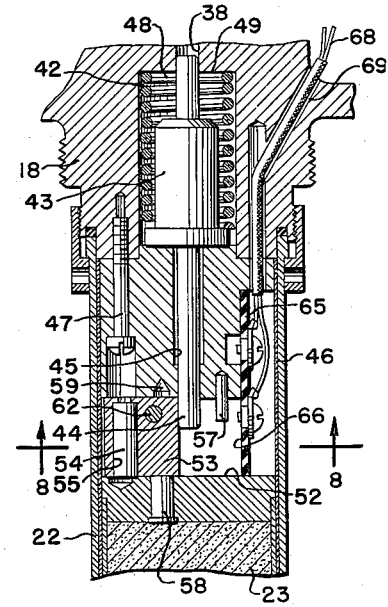
Fig. 5 is a sectional view taken along the line 5—5 of Fig. 4.

Referring to Fig. 10 plate 105 has a common ground ring 129 having tabs 131 to which ground wires of the circuit are attached, the ring 129 having positive connection with housing 100 thus establishing a ground connection with other major metallic portions of the device.

Figure 11:
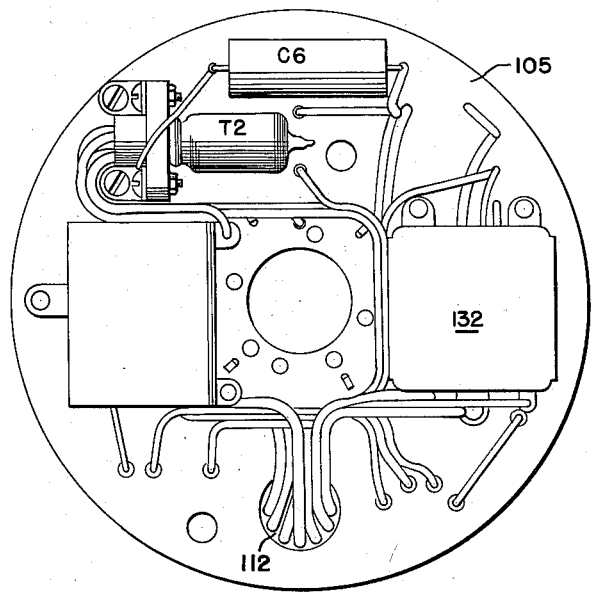
Fig. 11 is a detail elevation of the other side of the mounting plate with other circuit components mounted thereon.
Figure 8:
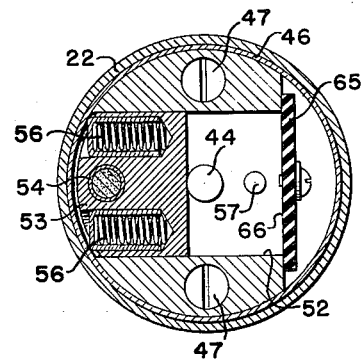
Fig. 8 is a sectional view taken along the line 8—8 of Fig. 5.

As shown in Fig. 11, it is desirable that all three glow tubes be shielded and T3 and T4 be illuminated by T1 in order to stabilize their firing voltages. Thus these tubes are placed in metallic enclosure 132 mounted on plate 105 with T1 between T3 and T4.

Referring particularly to the diagram of Fig. 12, preferably four tubes T1, T2, T3, and T4 are employed in the circuits of the present invention. Tubes T1, T3 and T4 are gas-filled glow tubes having a cold cathode 120, starter anode 121, and anode 122. Tube T2 is a detector-amplifier of the diode-pentode type having a filament-cathode 123 and diode plate 124 comprising the diode or detector portion of the tube; filament-cathode 123, control grid 125, screen grid 126, suppressor grid 127, and plate 128 forming the pentode or amplifier portion of the tube. If desired, the detector and amplifier circuits may each have a separate tube individual thereto.

The pulse oscillating, detecting, amplifying and firing circuits for the device of the present invention are disclosed in Fig. 12 and comprise the pick-up magnetometer M which obtains the excitation thereof from a glow tube oscillator circuit including glow tube T1 and associated elements, the operation of the magnetometer depending on the magnetic saturating properties of the Permalloy cores 91 and 92 of the coils M1 and M2 when acted on by the pulse excitation of the oscillator circuit and the external magnetic field. The positive pulses from the magnetometer M operate a shunt diode circuit made up of the diode-detector portion of a diode-pentode tube T2 and associated elements. The rectified voltage produced by tube T2 is negative with respect to ground and varies from about 45 volts to about 60 volts as the field strength detected by the magnetometer M varies between −600 and +600 milligausses.

Changes in the diode output voltage are applied to the amplifier portion of tube T2 through coupling condenser C6. Condenser C6 is preferably of the mineral oil-filled type to ensure a negligible spurious signal (less than one volt) when grid switch SW3 opens as will be hereinafter more fully described. In order that the charge on condenser C6 will stabilize quickly to a value determined by the diode voltage produced by the undisturbed field along the axis of the magnetometer M, the amplifier grid resistor R7 is kept shorted by hydrostatic switch SW3 until the depth charge is armed by immersion in the water. The hydrostatic arming switches SW3 and SW4 are set to operate when the depth charge has reached a sufficient depth to be in substantially stable downward travel thus preventing the picking up of spurious signals by the magnetometer and the attendant operation of the firing circuit until a large ferromagnetic body such, for example, as a submarine is approached by the device of the present invention. The amplifier stage is capable of producing about three times the gain necessary so that a moderate amount of stabilizing voltage feedback is incorporated therein.

The firing circuit is of the single-look variety, that is, the primer 61 is fired when a signal of sufficient strength of either positive or negative polarity is received by the magnetometer. Glow tubes T3 and T4 and associated apparatus comprise the firing circuit, the nominal breakdown voltage of these tubes being, for example, 77 volts. The starters 121 of T3 and T4 are battery biased, for example, to 58.5 volts, thus a nominal increase of starter-cathode voltage of 18.5 volts is required to fire these tubes. As is clear from an inspection of Fig. 12, a positive signal from the amplifier circuit increases the starter-cathode voltage of tube T4 and decreases the starter cathode voltage of tube T3. Conversely, a negative signal from the amplifier increases the starter-cathode voltage of tube T3. Thus, tube T4 is fired by a positive signal and tube T3 is fired by a negative signal. If tube T3 fires, the cathode 120 thereof jumps to a positive voltage which charges condensers C8 and C7 positively before the main gap between cathode 120 and anode 122 of T3 extinguishes due to lack of sufficient sustaining current. This applies sufficient positive voltage to the starter 121 of T4 to fire the tube. Thus tube T4 is fired directly on positive signals and through tube T3 on negative signals. When the main gap between cathode 120 and anode 122 of T4 breaks down, condenser C11 discharges therethrough and primer 61 is fired provided switch SW4 is closed. If detonator holder 53 has been moved to the armed position, detonator 54 will be ignited by the firing of primer 61 thus igniting lead-in 58, firing booster charge 23 and the main charge 12.

Referring in greater particularity to the diagram of Fig. 12, the relaxation oscillator circuit comprising tube T1, condenser C1, C2 and C3 resistors R1 and R2 and the magnetometer M are to be considered together, as the magnetometer forms the load for the oscillator. The time constant of the starting gap resistor R1 and condenser C1 is considerably higher than the time constant of the main gap resistor R2 and condenser C2 which permits the main gap condenser to charge up nearly to the supply battery voltage before breakdown, thus causing the timing of the oscillator to depend on the starting gap breakdown and extinction voltages and the values of resistor R1 and condenser C1, but not on the values of R2 and C2. The amount of excitation energy supplied the magnetometer M during each pulse depends mainly on the voltage build-up in C2 and the capacity thereof. The resistance of R2 is made small so that C2 will charge to the maximum voltage before the main gap breaks down. R2 is, of course, of sufficient size to ensure operation of the oscillator tube. This circuit preferably provides a pulse rate of about 150 cycles per second.

In order to provide for a substantially constant sensitivity over the background range with the low excitation energy per cycle available, it is desirable that the load presented to the oscillator by the magnetometer M be made substantially constant. This is effected by employing in the circuit a pair of Permalloy core magnetometer coils M1 and M2 and connecting the magnetometer M across the oscillator with the coil M1 in series with the tapped portion of the coil M2. Two identical Permalloy cores having the windings M1 and M2 thereon are mutually positioned parallel in close adjacency and the windings thereon are phased so that the magnetizing forces of the external field and current pulse add for one core and oppose each other for the other core. Since the number of turns on coil M1 is equal to the number of turns to the tap on M2, the oscillator load is substantially balanced against changes in background field, a change of external field increasing the amount of magnetic saturation produced by the oscillator pulses in one core while decreasing this saturation in the other core. The output of the magnetometer to the diode circuit is provided by the whole of the coil M2, thus the unbalanced effect of a single coil, single core, magnetometer is preserved. The use of a part of the coil M2 for excitation purposes and the whole of the coil for connection to the diode rectifier results in amplification of the output voltage pulses of the coil by auto-transformer action. Such unbalance is desirable for the reason that it makes unnecessary the use of magnetic bias to prevent the magnetometer output from going through a minimum and the sensitivity from going through zero near zero background field.

The two coil, two core arrangement provides a stable circuit wherein slight variations in the various components have no appreciable effect on the effectiveness thereof. It has also been found that the use of condenser C3 from the oscillator cathode of tube T1 to ground stabilizes the voltage output of the oscillator, increases the overall sensitivity of the circuit, and increases the uniformity of performance for different oscillator tubes.

The D.C. diode circuit comprises the diode portion of diode-pentode tube T2, condensers C4 and C5, and resistors R3, R4, R15 and R5. It is a conventional shunt diode circuit with C4 the diode condenser, R3, R4, R15 and R5 forming the D.C. diode load resistance and C5 furnishing the A.C. filtering. Resistor R4 is made variable so that sensitivity adjustments may be made and parts having standard tolerances employed.

The amplifier circuit makes use of the pentode portion of tube T2 and is provided with two degenerative feedback networks. Resistors R8 and R9 provide stabilization of the amplifier plate voltage operating point. This is desirable where the grid bias is fixed and the screen voltage is fixed as in the present instance. In order to operate the firing circuit, the amplifier plate voltage must swing as much as 18.5 volts, as aforesaid, and considerably in excess thereof for firing on slow signals. Thus the plate voltage operating point must be held within a narrow range in order that such wide swings in plate voltage in either direction may be possible. The feedback provided by resistors R8 and R9 has the effect of reducing the effective time constant of the coupling circuit between the diode of tube T2 and the amplifier thereof. In order to offset such an effect, the degenerative feedback from resistors R5 and R6 has been provided which has the effect of increasing this time constant. Negative bias for the grid at the pentode portion of tube T2 is furnished by battery 131 and the voltage divider made up at resistors R8 and R16.

The shunt condenser C7 is provided in the circuit to produce additional filtering out of the magnetometer output voltage pulses. The effect of these voltage pulses reaching the firing circuit would be to tend to nullify the effect of the condenser-resistor coupling circuit between the diode and amplifier. C7 also furnishes a low impedance transfer current path for the firing circuit tubes T3 and T4.

The firing circuit comprises negative tube T3 and positive tube T4, condensers C8, C9, C10 and C11, and resistors R11, R12, R13 and R14. The transfer of firing from negative tube T3 to positive tube T4 depends on the impedance, looking back into the amplifier, being high enough so that the positive charge generated when negative tube T3 fires is not excessively attenuated before reaching the starter 121 of positive tube T4.

Condenser C10 is employed to permit sufficient transfer current to flow in the starting gap of T3 when the starter-cathode voltage thereof reaches breakdown value. The impedance of all other transfer current paths is made amply low by the low impedance of the amplifier output and the network of condensers C7, C8 and C9. The operation of the firing circuit has been described more fully elsewhere in this description.

Battery assembly 104, comprising B1, B2, and B3 supplies all electrical power requirements of the circuit employed in the present invention for detecting the signal of a magnetic anomaly, amplifying the signal, and firing the primer.

In operation the device of the present invention is launched from a vessel or other launching medium, the device being preferably thrown or launched for flight ahead of the vessel toward the target, for example, a submarine. As the depth charge 10 is launched the lanyard 87, which has one end thereof fixed to the vessel, causes the cutting tool 84 to sever strap 39. When strap 39 is severed pin 26 moves outwardly closing switches SW1 and SW2 thus warming up the circuit sufficiently to ensure operation thereof when arming is completed.

When depth charge 10 strikes the surface of the water inertia weight 43 moves forward compressing spring 48 thus freeing detonator holder 53 which moves to align detonator 54 with bore 59 and lead-in 58 thus arming the detonator. Shaft 44 of weight 43 is held against return to the initial position thereof by holder 53 at one end thereof and shaft 44 extends across bore 25 at the other end thereof to prevent return of pin 26 to the initial position thereof, thus maintaining switches SW1 and SW2 in the closed position. The hydrostatic switches SW3 and SW4 are provided with sufficient time delay to prevent operation thereof until the depth charge 10 is in stable downward travel through the water thus preventing firing to the primer 61 of the firing mechanism by a spurious signal developed by angular gyrations of the pick-up or magnetometer coils M1 and M2 in the earth's magnetic field during the period of turbulence immediately succeeding entry of the depth charge into the water. If desired switches SW3 and SW4 may be combined in a single hydrostatic unit rather than the pair of units disclosed in the drawings.

When the megnetometer coils M1 and M2 come into proximity with the target either a positive or negative signal is produced in the detector or diode portion of tube T2 the signal being amplified by the amplifier or pentode portion thereof, thus causing firing of negative tube T3 and positive tube T4, in case of a negative signal and in case of a positive signal only positive tube T4 is fired. When either tubes T3 and T4 are fired or tube T4 alone is fired, the primer 61 is ignited which through bore 59 ignites detonator 54, lead-in 58, booster charge 23 and thus firing main charge 12.

Obviously many modifications and variations of the present invention are possible in the light of the above teachings. It is therefore to be understood that within the scope of the appended claims the invention may be practiced otherwise than as specifically described.

What is desired to be secured by Letters Patent of the United States is:

1. A depth charge adapted to be launched from a launching medium on a trajectory through the air into a body of water and comprising, a casing for said depth charge, a main explosive charge mounted in said casing, a fuze housing mounted on said casing, a booster charge mounted on said housing and extending into said casing in close adjacency to said main charge, an electroresponsive firing train for said booster charge, inertia operated means mounted in said train for initially interrupting said firing train and for subsequently completing said firing train, a strap encircling said casing, a spring-urged rod mounted in said casing and retained by said strap, means for severing said trap and operable to release said rod as said depth charge is launched, said rod releasing said interrupting means as the rod is operated thereby to complete said firing train, a circuit for firing said firing train, closing means for said circuit in operative engagement with said rod, said closing means closing said circuit to warm said circuit as said rod is released, a pair of hydrostatic switches carried by said casing, means for operating said switches in time delayed relation as the depth charge descends in the water, one of said switches being normally closed and the other of said switches being normally open, and a magnetometer mounted in said housing having a pair of coils and magnetically saturable cores therefor whereby a current is produced in said coils when said cores are influenced by a magnetic anomaly in the earth's magnetic field, said circuit having detecting, amplifying and firing means including a primer carried by said casing and connected to said coils for operation of said firing means to fire said primer when a current is produced in said coils, said normally closed switch being connected in said detecting means and preventing spurious firing of the circuit when said closing means is closed and opening to render said detecting means effective when one of said hydrostatic switches is operated, said normally open switch maintaining said firing means open with respect to said primer and rendering said firing means closed with respect to said primer when operated by the other of said hydrostatic switches.

2. A depth charge adapted to be launched from a launching medium and comprising, in combination, a casing for depth charge having main charge, rocket, and tail portions, a main charge contained in said main charge portion, a fuze housing secured to the leading end of said main charge portion, a plurality of canted fins mounted on said portion for stabilizing and imparting rotation to said depth charge, a booster charge mounted in said main charge, an electroresponsive primer for initiating the firing of said booster charge, a firing train interposed between said primer and said booster charge, a strap encircling said fuze housing, a yieldable arming rod mounted in said fuze housing and retained by said strap, means controlled by said arming rod for initially interrupting said firing train, cutting means engaging said strap and secured by a lanyard to said launching medium, said cutting means severing said strap when said depth charge is launched thereby to release said arming rod which in turn releases the interrupting means to cause the completion of said firing train, a magnetometer axially mounted in said fuze housing, said magnetometer comprising a pair of coils having magnetically saturable cores individual thereto, a pulse oscillating circuit including a glow tube, said pulse circuit being connected to said coils for exciting said cores, a detector circuit connected to said coils for detecting changes in either direction of the amplitude of the magnetometer output voltage pulses, said changes being induced by a change in the earth's magnetic field caused by a magnetic anomaly, an amplifier circuit connected to said detector circuit for amplifying the output of said detector circuit, a firing circuit including a positive firing glow tube and a negative firing glow tube for receiving the output of said amplifier circuit, said negative tube firing and thereby firing said positive tube whereby said primer is fired when a current of negative polarity is received, said positive tube firing said primer directly when a positive current is received, switch means operatively connected to said arming rod and operated thereby to warm said circuits as the depth charge is launched, and hydrostatic means for arming said circuits when said depth charge has entered a body of water and has reached a condition of stable downward travel.

3. A depth charge adapted to be launched from a launching medium and rocket-propelled on a trajectory through the air into a body of water comprising, in combination, a casing, a rocket motor mounted in the trailing end of said casing, a main charge adapted to be fired underwater mounted in the leading end of said casing, a non-magnetic housing secured on the leading end of said casing, a magnetometer having a plurality of coils and magnetically saturable cores therefor axially mounted in said housing, pulse oscillating means connected to said magnetometer for applying a measured pulse oscillating current to said coils, detecting means connected to said magnetometer for detecting signal currents generated by said magnetometer in response to a magnetic anomaly in the earth's magnetic field, amplifying means connected to said detecting means for amplifying said signal currents, firing means connected to said amplifying means, an electroresponsive primer connected to said firing means and adapted to be ignited when said firing means is energized, means for energizing said pulse oscillating means, said detecting means, said amplifying means and said firing means when the depth charge is launched, and hydrostatic time-delay arming means for connecting said primer to the firing means when the depth charge reaches a state of stable downward travel in the water whereby said primer is armed to fire when said firing means operates.

4. A depth charge comprising, in combination, a casing for said depth charge, a main charge for the depth charge mounted in said casing, a fuse housing mounted on the forward end of said main charge casing, a booster charge mounted on said housing and extending into said casing in close adjacency to said main charge, an electroresponsive primer mounted in said housing and mounted at one end of a bore formed therein and communicating with said booster charge, a lead-in mounted adjacent said booster charge in said housing in the other end of said bore, a slideable detonator assembly interposed between said lead-in and said primer initially blocking said bore and holding said detonator out of alignment with said bore and spring-urged to bring said detonator into alignment therewith when released, an inertia actuated device responsive only to a setforward force suddenly applied thereto initially engaging said detonator assembly for retaining said detonator assembly and releasing said detonator assembly for movement of the detonator into alignment with said primer and said lead-in when subjected to said setforward force as the depth charge enters a body of water, a band encircling said housing, a yieldable member retained by said band for retaining said inertia actuated device in the initial position thereof and releasing said device for action by inertial setforward force when said yieldable member is released, and a circuit including a magnetometer for detecting a magnetic anomaly in the earth's magnetic field whereby said circuit energizes said primer to fire the detonator, lead-in booster charge and thus the main charge.

References Cited in the file of this patent
UNITED STATES PATENTS

| | | |
|---|---|---|
| 1,447,101 | Parkhurst | Feb. 27, 1923 |
| 2,357,759 | Nichols | Sept. 6, 1944 |
| 2,399,523 | Van Atta et al. | Apr. 30, 1946 |
| 2,400,549 | Glennon et al. | May 21, 1946 |
| 2,405,932 | Alderman | Aug. 20, 1946 |
| 2,406,870 | Vacquier | Sept. 3, 1946 |
| 2,505,000 | Moore | Apr. 25, 1950 |
| 2,599,579 | Park et al. | June 10, 1952 |
| 2,601,245 | Bowersett | June 24, 1952 |
| 2,789,502 | Willis et al. | Apr. 23, 1957 |